US009283688B2

(12) United States Patent
Tillmann et al.

(10) Patent No.: US 9,283,688 B2
(45) Date of Patent: Mar. 15, 2016

(54) METHOD FOR CUTTING BLOCK MATERIALS AND CUTTING MACHINE FOR CUTTING BLOCK MATERIALS

(75) Inventors: Michael Tillmann, Wuerselen (DE); Helmut Toennes, Dueren (DE); Ludger Weingaertner, Aachen (DE)

(73) Assignee: Fecken-Kirfel GmbH & Co. KG, Aachen (DE)

( * ) Notice: Subject to any disclaimer, the term of this patent is extended or adjusted under 35 U.S.C. 154(b) by 330 days.

(21) Appl. No.: 13/877,636

(22) PCT Filed: Oct. 4, 2011

(86) PCT No.: PCT/EP2011/067320
§ 371 (c)(1),
(2), (4) Date: Apr. 3, 2013

(87) PCT Pub. No.: WO2012/045745
PCT Pub. Date: Apr. 12, 2012

(65) Prior Publication Data
US 2013/0199347 A1 Aug. 8, 2013

(30) Foreign Application Priority Data
Oct. 8, 2010 (DE) .......................... 10 2010 047 749

(51) Int. Cl.
*B27B 3/00* (2006.01)
*B26D 5/08* (2006.01)
(Continued)

(52) U.S. Cl.
CPC ............... *B26D 5/086* (2013.01); *B23D 51/12* (2013.01); *B23D 51/16* (2013.01);
(Continued)

(58) Field of Classification Search
CPC ............ Y10T 83/7055; Y10T 83/7015; Y10T 83/702; Y10T 83/687; Y10T 83/04; B26B 7/00; B23D 51/125; B23D 51/16–51/20; B23D 49/007; B23D 51/12; B27B 19/004; B27B 19/12
USPC .......................................................... 83/784
See application file for complete search history.

(56) References Cited

U.S. PATENT DOCUMENTS 2,720,228 A * 10/1955 Traben ............................. 83/784
4,989,488 A    2/1991 Potzsch
5,299,483 A    4/1994 Ber-Fong

FOREIGN PATENT DOCUMENTS

DE    3629664 A1    3/1988
DE    3812587 A1    4/1988
(Continued)

OTHER PUBLICATIONS

International Search Report dated Jan. 16, 2012, as issued in corresponding International Patent Application No. PCT/EP2011/067320, filed on Oct. 4, 2011—2 pages.

*Primary Examiner* — Kenneth E. Peterson
*Assistant Examiner* — Samuel A Davies
(74) *Attorney, Agent, or Firm* — Maier & Maier, PLLC

(57) ABSTRACT

A method for the cutting of block materials, particularly foamed or expanded materials, wherein a knife element having first and second ends is driven in a translatory manner in longitudinal direction so as to perform a reciprocating movement. The driving force is exerted on the first and second end of the knife element, the driving of the first end of the knife element being performed by conversion of a first rotary movement into a first translatory movement, and the driving of the second end of the knife element being performed by conversion of a second rotary movement into a second translatory movement in a sense opposed to that of the first translatory movement.

16 Claims, 3 Drawing Sheets

Figure 1:
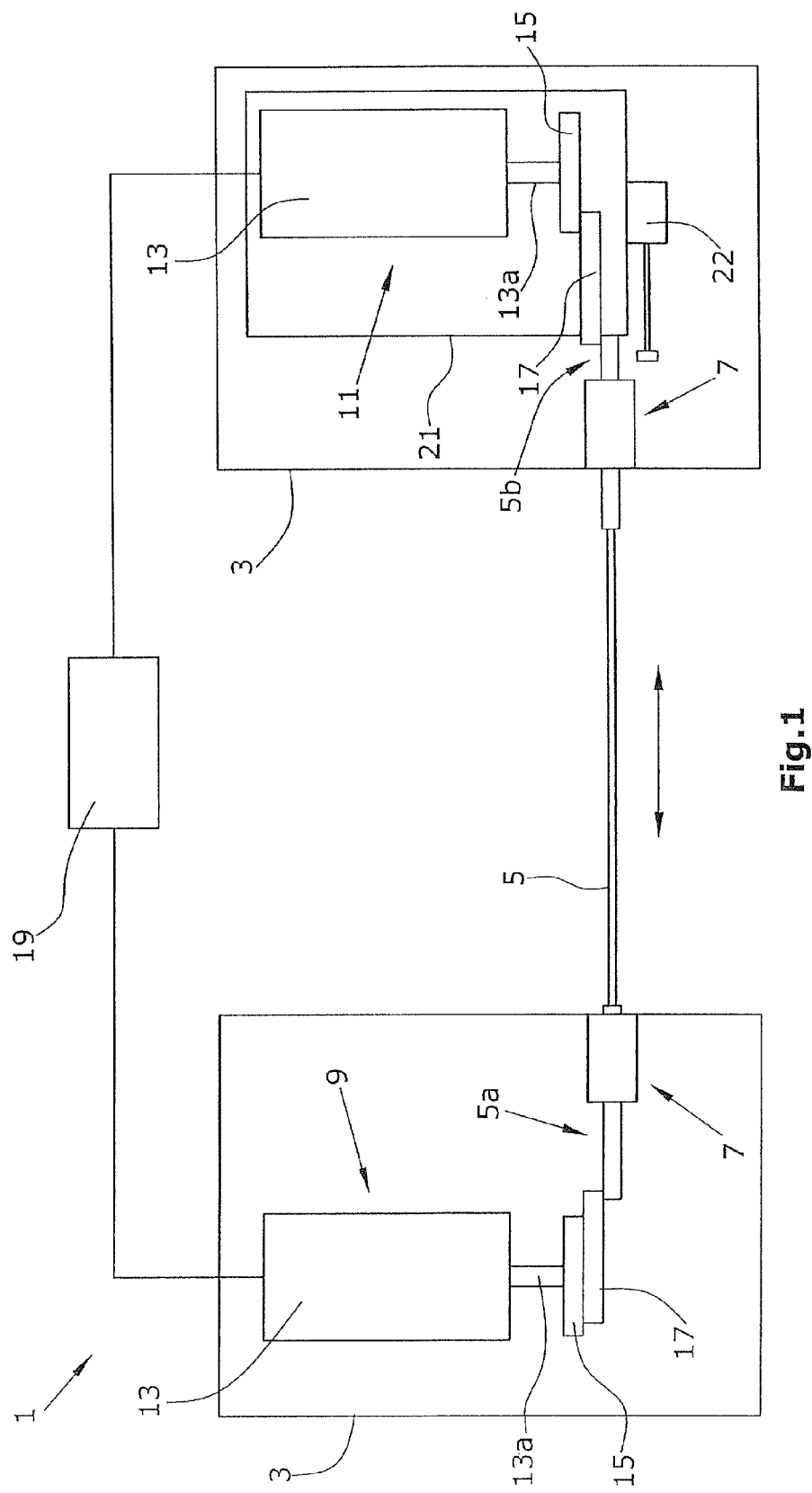

(51) Int. Cl.
- *B23D 51/12* (2006.01)
- *B23D 51/16* (2006.01)
- *B23D 57/00* (2006.01)
- *B26D 1/10* (2006.01)
- *B26D 1/547* (2006.01)
- *B26D 3/00* (2006.01)
- *B26D 5/14* (2006.01)

(52) U.S. Cl.
CPC ............. *B23D 57/0053* (2013.01); *B26D 1/10* (2013.01); *B26D 1/547* (2013.01); *B26D 3/006* (2013.01); *B26D 5/14* (2013.01); *Y10T 83/04* (2015.04); *Y10T 83/687* (2015.04); *Y10T 83/7055* (2015.04)

(56) References Cited

FOREIGN PATENT DOCUMENTS

| | | |
|---|---|---|
| DE | 4309327 A1 | 10/1994 |
| DE | 4393341 B4 | 4/2006 |
| GB | 2283453 A | 10/1995 |
| GB | 2401031 A | 11/2004 |

\* cited by examiner

METHOD FOR CUTTING BLOCK MATERIALS AND CUTTING MACHINE FOR CUTTING BLOCK MATERIALS

RELATED APPLICATIONS

This is the U.S. national stage application which claims priority under 35 U.S.C. §371 to International Patent Application No.: PCT EP2011/067320 filed Oct. 4, 2011 which claims priority to German Patent Application No. 102010047749.4 filed, Oct. 8, 2010, the disclosures of which are incorporated by to reference herein their entireties.

The present invention relates to method for the cutting of block-shaped materials, a cutting machine for the cutting of block materials, and a method for operating such a cutting machine.

Cutting machines for block materials, such as e.g. foamed materials, are used for cutting shaped pieces out of the material blocks. This has the advantage that the material can first be conveniently delivered in the form of large blocks while the corresponding shaped pieces can then be cut from these blocks as required.

In so-called contour cutting machines, use is made inter alia of oscillating knives which are operative to oscillate e.g. at a frequency from 20 to 50 Hertz wherein, during oscillation, the knives perform a stroke in a range from 25 to 60 mm.

The knives used can be designed in various manners, such as e.g. in the form of a linear or toothed knife, or also as a cutting wire or a saw. For obtaining a good cutting result that is uniform across the whole width of the machine, it is advantageous to subject the knife to a tensioning force. Depending on the respective type knife, the tensioning force can be from 300 to 700 N/mm².

However, the oscillating movement of the knife element often entails the difficulty that each change of direction of the knife element during the oscillating movement may also happen to cause a change of the knife tension so that the knife will be allowed to slacken and then will be tensioned again. Since, however, a satisfying cutting result can be achieved only with a best constant tension of the knife, many efforts have been undertaken to provide cutting machines which, during an oscillating movement of the knife element, can maintain a best constant tension of the knife element.

From DE 38 12 587, for instance, it is known to connect the knife element with a guide wire which together with the knife element forms a closed ring. Said guide wire is guided via guide rollers and is driven via a drive mechanism. A cutting machine of this type makes it possible to obtain a fairly good cutting result since the knife tension during the oscillating movement will remain relatively constant. However, said guide wire is very prone to wear so that, nearly each time the knife is exchanged, also the guide wire will have to be exchanged, thus causing considerable costs. Also the pulleys are highly susceptible to wear, which is the case due to the oscillating movement by which they are moved. Apart from this drawback, the pulleys transmit the oscillating movement as vibration onto the machine body, thus limiting the accuracy of the cutting result. Further still, the guide wire solution requires a considerable constructional expenditure because the guide wire has to be guided around at a sufficient distance to the knife element so that also large block materials can be cut. This requirement makes it necessary to use a very large machine frame so that the resulting constructional expenditure will likewise cause high costs.

Known from DE 4 309 327 C2 is an alternative drive for a cutting machine. In this drive, two drive mechanisms for the knife ends are driven by a common motor. The drive mechanisms are set into a rotary motion in an rpm-synchronous manner, wherein the translatory movement of the knife element is generated by a respective eccentric disk with pushrod. Due to the conversion of the rotary movement into the translatory movement, however, the pivot points between the drive mechanisms and the knife during a revolution of the drive mechanisms will not maintain their distances, thus causing variations of the tension of the knife element during operation. Further, because of the common drive via a motor, there is necessitated considerable constructional expenditure which also causes a large space requirement. As a result, similar to the approach known from DE 38 12 587, one will need much space and have to bear the resulting higher costs for manufacture.

For this reason, DE 43 93 341 B4 proposes to arrange two drive units at the end of a cutting element, each of said drive units comprising a tensioning means which, during operation, will continuously exert a force onto the cutting element for keeping it tensioned during the oscillation movement. Such an approach, however, is unsatisfactory because the tensioning means are too inert for being able to compensate the highly dynamic differences in tension, while the provision of tensioning means requires massive technical expenditure.

Accordingly, it is an object of the present invention to improve the cutting machine of the above type to the effect that an oscillating cutting movement can be generated with low constructional expenditure, while the knife element shall have a best constant tension. Further, it is an object of the present invention to provide an improved method for the cutting of block materials.

The above object is achieved by the features of claims 1, 10 and 15.

In a method according to the present invention, provided for the cutting of block materials, particularly foamed or expanded materials, it is provided that a knife element having first and second ends is driven in a translatory manner in longitudinal direction so as to perform a reciprocating movement, the driving force being exerted on the first and second ends of the knife element. The driving of the first end of the knife element is performed by conversion of a first rotary movement into a first translatory movement, and the driving of the second end of the knife element is performed by conversion of a second rotary movement into a second translatory movement in a sense opposed to that of the first translatory movement. The rotational frequency of the first rotary movement is, with respect to full revolutions, equal to the rotational frequency of the second rotary movement. In one revolution of the first and second rotary movements, the first rotary movement has a higher angular speed in a first and a second partial range of the revolution than the second rotary movement, and in a third and a fourth partial range of the revolution, the second rotary movement has a higher angular speed than the first rotary movement. At the start and respectively the end of a revolution and at the transition between the second and the third partial ranges of the revolution, the first and second rotary movements have an identical angular speed.

In other words, both rotary movements will need exactly the same time for a revolution. However, the rotary movements will be differently accelerated and decelerated during a revolution so that, during a revolution, the two rotary movements have different angular speed developments. Thus, the rotary movements have identical rotational speeds but will not run synchronously during a revolution.

It has become evident that, by the above outlined controlling of the rotary movements which are generated by conversion of the rotary movement into a translatory movement, length deviations between the pivot points of the knife element can be compensated so that, during oscillating translatory movement of the knife element, a substantially constant knife tension can be maintained.

It can be provided that the first rotary movement will be accelerated in the first and fourth partial ranges of the revolution and will be decelerated in the second and third partial ranges.

It can also be provided that the second rotary movement will be decelerated in the first and fourth partial ranges of the revolution and will be accelerated in the second and third partial ranges. By such acceleration and deceleration processes during a revolution, the desired speed profile can be reached.

The profiles of the angular speed of the rotary movements are provided in such a manner that, after half of the average period of a revolution, the two rotary movements have the same angular speed. In other words, the transition between the second and third partial ranges of the revolution will occur after half the average time needed for one revolution. In a transition from one revolution to the next, the two rotary movements will again reach the same speed, with the result that the angular speed of the two rotary movements will be identical at the start and respectively the end of a revolution.

In the speed profile of the invention, it can be provided e.g. that, in case of imaginary equivalent points which perform the two rotary movements, the point of the first rotary movement will first lag behind the point of the second rotary movement.

By the acceleration of the first rotary movement in the first partial range and the deceleration of the second rotary movement in the first partial range, the point of the first rotary movement will catch up relative the point of the second rotary movement so that, after about ¼ of the average time needed for one revolution, both points will reach the 90° mark. At this instant, the first rotary movement has traversed an angular range of more than 90° while the second movement has traversed an angular range of less than 90°. Thus, the imaginary point of the first rotary movement will now overtake the point of the second rotary movement while, in the second range of the revolution, there will occur a deceleration of the first rotary movement and an acceleration of the second rotary movement. At half the revolution time and thus at the transition between the second and the third range of the revolution, the first rotary movement will run ahead of the second rotary movement at a distance which corresponds to the distance between the points existing at the start of the revolution, but in reverse order. At this moment, the two rotational movements will again have reached the same angular speed. The second rotary movement will be accelerated in the third range of the revolution, while the first rotary movement will be decelerated so that, after ¾ of the average revolution time, both imaginary points will be even at about 270°. Due to the higher angular speed, the imaginary point of the second rotary movement will overtake the imaginary point of the first rotary movement, while only the second rotary movement will be decelerated in the fourth range of the revolution whereas the first rotary movement will be accelerated again, until, at the end of the revolution, both rotary movements will again have the same speed, and the points will have the distance that existed at the start of the revolution.

In a method according to the invention, it is provided that the first and second rotary movements are generated by first and second servo motors. Since, during the cutting processes, the two knife elements oscillate at very high frequencies, e.g. 20 to 60 Hertz, the acceleration and deceleration processes of the rotary movements are highly dynamic. It has turned out that such highly dynamic processes can be conveniently generated by modern servo motors.

In this regard, it can be provided that the first and second rotary movements will each be converted into the first and respectively the second translatory movement by means of an eccentric disk with pushrod. By use of such devices, conversion of a rotary movement to a translatory movement can be realized in a simple manner under the constructional aspect.

In one preferred method according to the invention, it is provided that a controlling of the first and second rotary movements is performed via a master/slave control unit, wherein an actual angular speed of the first rotary movement is preset as a desired angular speed of the second rotary movement or an actual angular speed of the second rotary movement is preset as a desired angular speed of the first rotary movement. Such a control has proven to be of particular advantage for generating the inventive speed profiles of the rotary movements. The speed profiles of the invention are obtained by super-imposing them to the master/slave control unit as further control commands.

The angular speeds of the first and/or the second rotary movement may periodically vary during a revolution.

In one method according to the invention, it is provided that the knife element is rotatable about an axis extending in the longitudinal direction of the knife element. In this manner, the method of the invention can be used for performing cuts in different planes.

In one variant of the method of the invention, it is provided that differences in the angle of rotation between the first and second rotary movements as may occur during a revolution, will amount to 10° at maximum.

The invention further provides a cutting machine for the cutting of block materials, particularly foamed or expanded materials. Said cutting machine comprises a machine frame and a knife element having first and second ends. A guide means is operative to guide the knife element in a longitudinal direction of the knife element so that the knife element can perform only a translatory movement in its longitudinal direction. The cutting machine comprises first and second drive units, the first drive unit being coupled to the first end of the knife element and the second drive unit being coupled to the second end of the knife element. The first or the second drive unit is arranged on a tensioning means provided for setting the tension of the knife element. The first and second drive unit each comprise a servo motor and an eccentric disk with pushrod, said disk being coupled to the servo motor, wherein the first and second ends of the knife element have a respective one of said pushrods connected to it. A common control unit is operative to control the servo motors of the first and second drive units. Said control unit is operative to control the rotational frequency of the servo motors synchronously with respect to a full revolution, and, during a revolution of the servo motors, will decelerate and accelerate at least one of the servo motors.

Thereby, in a first and a second partial range of the revolution, the servo motor of the first drive unit has a larger angular speed than the servo motor of the second drive unit and, in a third and a fourth partial range of the revolution, the servo motor of the second drive unit has a larger angular speed than the servo motor of the first drive unit.

Because of the two drive units which are controlled only together, such a cutting machine can be given a very compact design, while, with the aid of the two drive units, it can nonetheless be guaranteed that, during the oscillating movement of the knife element, the latter will have the desired constant tension. Thereby, a very good cutting result can be accomplished. The machine frame on which the knife element is arranged can be given a very compact size so that, for performing the machine frame movements required for cutting, a considerably smaller mass has to moved in comparison to the complex structures of the state of the art, which will in itself contribute to an improved cutting result. Since each drive unit consists merely of a servo motor, an eccentric disk and a pushrod, the cutting machine of the invention has very simple technical design and thus can be produced at low cost. Further, due to the merely small number of movable parts and the simple construction, the cutting machine of the invention is distinguished by very low maintenance requirements and very low wear.

In one embodiment of the cutting machine of the invention, it can be provided that the control unit is a master/slave control, said control unit detecting an actual angular speed of the first servo motor and presetting it as a desired angular speed of the second servo motor or detecting an actual angular speed of the second servo motor and presetting it as a desired angular speed of the first servo motor.

In this manner, controlling the servo motors of the inventive cutting machine to reach the desired speed profile is possible in a particularly simple manner, it being accomplished that operation of the servo motors with a—with respect to full revolutions—synchronous rotational frequency is possible in the most simple manner.

In the cutting machine of the invention, the desired knife tension has to be set merely at the start of the operation with the aid of a tensioning means. By the speed profiles of the servo motors, the inventive cutting machine can guarantee that no or only minimum changes of the tension of the knife element will occur during the oscillation movement, thus rendering it unnecessary for the tensioning means to compensate for these. Only possible changes of the length of the knife element during operation, as caused e.g. by heating effects, have to be compensated by the tensioning means.

According to the invention, it can be provided that the tensioning means comprises a plate which is displaceable in the longitudinal direction of the knife element, said plate having the first or the second drive means arranged on it. By the provision of a displaceable plate, the knife element can be tensioned in a constructionally simple manner because the tensioning means will displace a complete drive assembly.

According to the invention, it can be provided that, with the aid of the guide means, the knife element is rotatable about an axis extending in the longitudinal direction of the knife element. Thereby, the cutting machine can carry out cuts in different cutting planes.

The knife element of the cutting machine of the invention can be arranged vertically or horizontally.

According to a preferred embodiment of the invention, it is provided that the servo motors are arranged vertically and the eccentric disks are arranged in a horizontal plane.

By the provision of the eccentric disks in a horizontal plane, it is not required that the pushrod attached to the eccentric disk is moved against gravity, thus avoiding influence on the rotary movement of the eccentric disk caused by external influences of gravity. By the arrangement of the servo motor in the vertical direction, the eccentric disk can be advantageously connected to the drive of the servo motor.

In one embodiment of the invention, it is provided that the pushrods have a length in a range from 150 mm to 300 mm. It has been found that, by well-aimed selection of the length of the pushrod, the maximal angular difference between the two rotary movements that is required for the invention can be reduced, whereby also the stress on the servo motors is reduced. By longer pushrods, the required angular difference can be further reduced while, however, longer pushrods would also increase the constructional size of a cutting machine of the invention. For this reason, it is of advantage to find a tradeoff between these two values.

The invention further provides a method for operating a cutting machine of the invention. According to this method, the servo motors of the first and second drive units of the cutting machine are driven with the same rotational frequency with respect to full revolutions. At the start and at the end of a revolution of the servo motors of the first and second drive units, the servo motors have the same rotational speed. In the first and the fourth partial range of the revolution, the servo motor of the first drive unit is accelerated and/or the servo motor of the second drive unit is decelerated.

In the second and the third partial range of the revolution, the servo motor of the first drive unit is decelerated and/or the servo motor of the second drive unit is accelerated.

At the transition between the second and the third partial range of the revolution, the servo motors have the same speed again.

Thus, in the inventive method for operating a cutting machine, it can be provided that the servo motor e.g. of the first drive unit is not accelerated or decelerated whereas, for generating the desired speed difference during a revolution, the servo motor of the second drive unit is decelerated or accelerated. It can also be provided that, conversely, the servo motor of the second drive unit maintains a constant speed and the speed changes are performed on the servo motor of the first drive unit. In order to avoid that, due to the highly dynamic processes, one of the servo motors is excessively stressed relative to the other one and thus will wear out faster, it has been found to be of advantage to stress the servo motors of the first and second drive units in the most uniform manner possible; thus, the cutting machine of the invention is preferably operated in that, during acceleration of the servo motor of the first drive unit, the servo motor of the second drive unit is decelerated and, conversely, during acceleration of the servo motor of the second drive unit, the servo motor of the first drive unit is decelerated.

The desired compensatory movement will thus be distributed onto both servo motors to the same extent.

Thus, the method of the invention for operating a cutting machine of the invention is suited to fully compensate for the differences in the distance between the pivot points of the knife element, as caused because of the conversion of rotary movements into translatory movements of the knife element, so that a uniform tension of the knife element can be achieved.

For use of knife elements within the framework of the invention, linear or toothed knives or also cutting wires are suited. The blocks that can be cut by use of the inventive method or the inventive cutting machine can consist of foamed material or expandable materials. For instance, the blocks can consist of PU, PE, PP, PS or PVC materials.

Figure 2:
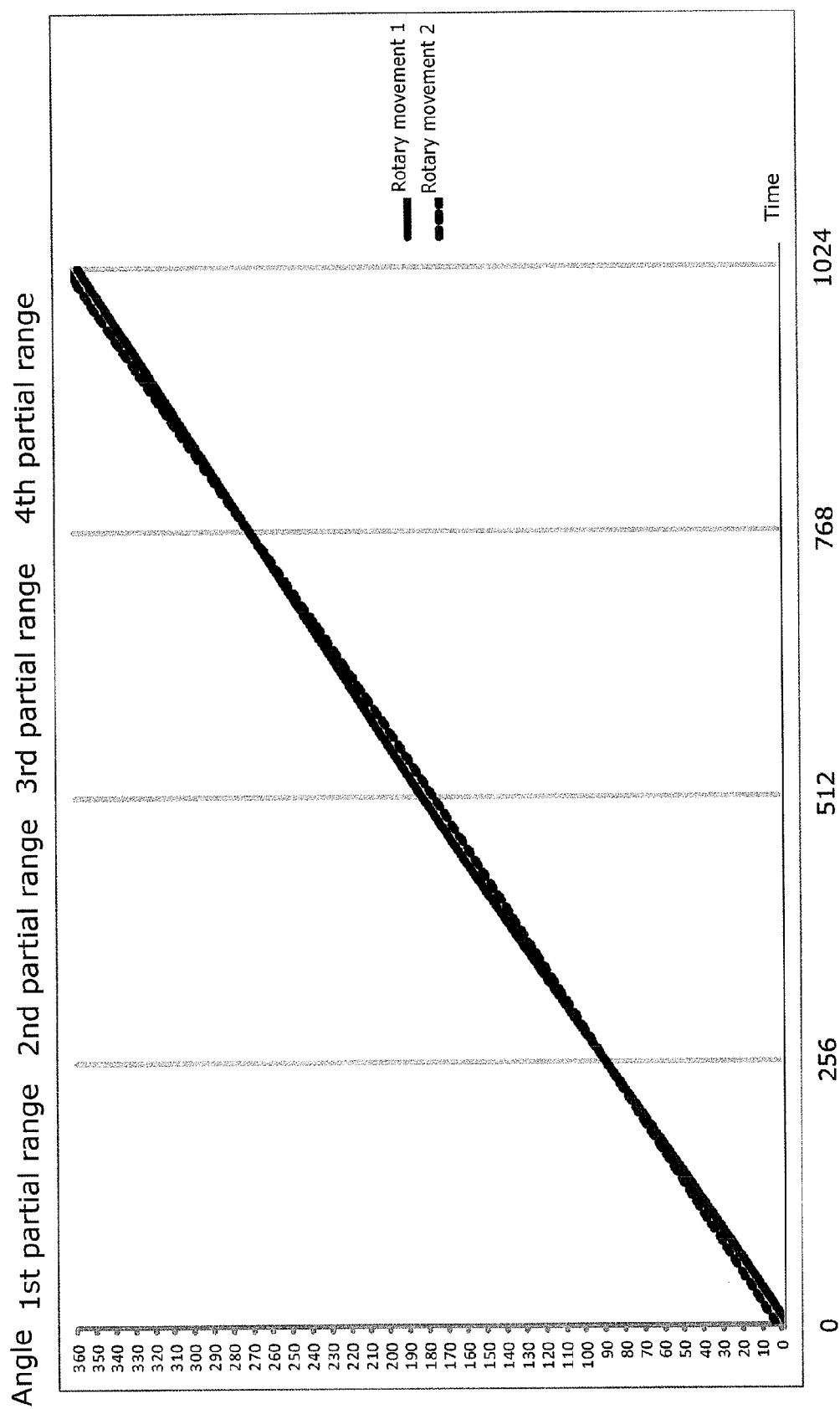
Figure 3:
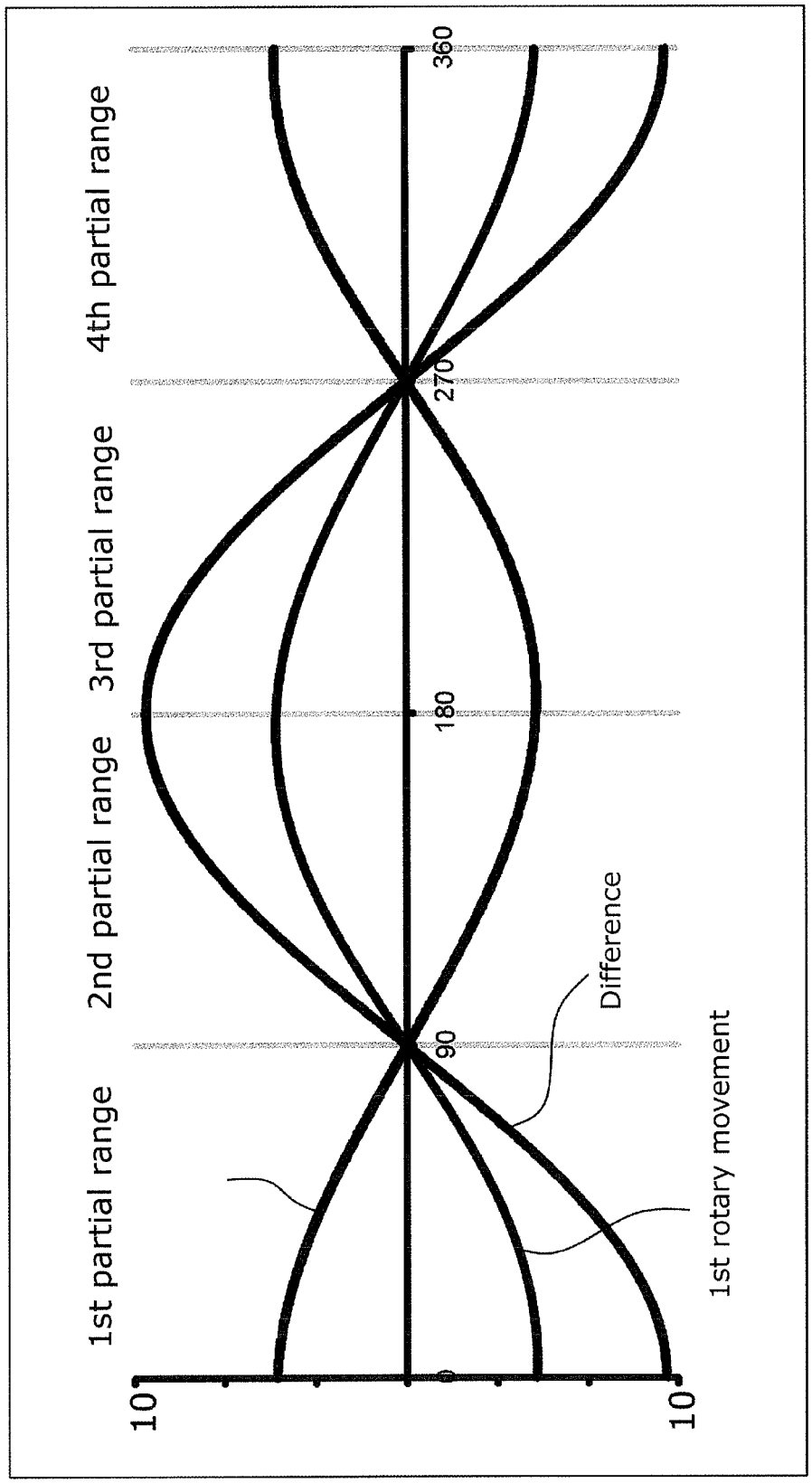

The invention will be explained in greater detail hereunder with reference to the attached Figures. The Figures show the following:

FIG. 1 a schematic lateral view of a cutting machine of the invention,

FIG. 2 a diagram of the angular development of the first and second rotary movements during a revolution, and FIG. 3 a diagram showing the angular deviations of the two rotary movements as occurring due to the differences in speed.

In FIG. 1, a cutting machine 1 according to the invention, provided for cutting of block materials, particularly foamed or expanded materials, is schematically illustrated in lateral view.

The cutting machine 1 comprises a machine frame 3 on which there is arranged a knife element 5 having a first end 5a and a second end 5b. Said knife element 5 is supported in a two-part guide means 7, so that the knife element 5 is guided in a longitudinal direction of the knife element 5.

The block materials, not shown, are supplied to the cutting machine 1 via conventional supply means. Alternatively, the cutting machine 1 itself will be displaced relative to the block materials for cutting.

Thus, knife element 5 can only perform a translatory movement in the longitudinal direction of knife element 5. In FIG. 1, the longitudinal direction of knife element 5 is marked by a bidirectional arrow.

Said first and second ends 5a,5b of knife element 5 pass through the two parts of guide means 7. The first and second ends 5a,5b of knife element 5 can be formed as square-end bar portions without cutting edge. A first drive unit 9 is coupled to the first end 5a of knife element 5, and a second drive unit 11 is coupled to the second end 5b of knife element 5.

Said first and second drive unit 9,11 comprise a respective servo motor 13. Each servo motor 13 has an output shaft 13a with an eccentric disk 15 coupled thereto. Eccentrically articulated to said eccentric disk is a pushrod 17 serving for connection to the first and second ends 5a,5b of the knife element. Thus, the first drive unit 9 and the second drive unit 11 are connected via pushrods to the first end 5a and the second end 5b of knife element 5.

Via the eccentric disks 15 and the pushrods 17 as well as the guide means 7, the rotary movement of the servo motors 13 is converted into a translatory movement of knife element 5.

The conversion of the rotary movement into a translatory movement has the effect—with exactly identical speed profiles of the eccentric disks—that the coupling points between the pushrods 17 and the first end 5a and the second end 5b of knife element 5 will have differing distances during a revolution of the eccentric disks 15 so that the tension in the knife element 5 would vary. However, for realizing a clean cut with the cutting machine of the invention, it is imperative that the knife tension is nearly constant.

For this reason, the servo motors 13 are controlled by a common control unit 19. The control unit 19 is operative to control the servo motors 13 with synchronous rotational frequencies, with respect to full revolutions. However, during a revolution, the servo motors 13 will be alternately decelerated and accelerated again so that, in a first and a second partial range of the revolution, the servo motor 13 of first drive unit 9 will have a higher angular speed than the servo motor 13 of second drive unit 11 and, in a third and a fourth partial range of the revolution, the servo motor 13 of second drive unit 11 will have a higher angular speed than the servo motor 13 of first drive unit 9.

In the above context, said common control unit 19 can comprise a CNC control and two controllers for the servo motors 13. Said CNC control sets the rotational speed as a default value of said controllers. In the controllers, the corresponding speed profile is stored as a default value.

In this manner, it is rendered possible to compensate for the differences in distance caused by the conversion of the rotary movement into a translatory movement, in that, during a revolution, the servo motors 13 of the drive units 9,11 will run ahead of, or lag behind, the respective other servo motor.

For setting the tension of knife element 5 prior to the start of a cutting process, the second drive unit 11 is arranged on a tensioning means 21 in the form of a displaceable plate. Via a corresponding force applicator, such as e.g. a pneumatic cylinder, an electric cylinder or hydraulic cylinder, said tensioning means 21 together with the drive unit 11 will be advanced forward until the desired tension in the knife element 5 has been reached. In order to compensate for the differences in length caused by heating effects in the knife element 5 during operation, said force applicator 22 can apply a force onto the tensioning means 21 on a permanent basis.

The guide means 7 can comprise a rotary means so that the knife element 5 is rotatable about an axis in the longitudinal direction of knife element 5. As a result, it will be possible, apart from performing cuts in the horizontal direction, to perform cuts also in other directions, e.g. in a vertical direction.

The servo motors 13 are arranged vertically, wherein the eccentric disks 15 are arranged in a horizontal plane. In this manner, it is avoided that the eccentric disks 15 might cause gravitation-related imbalances in a revolution of the servo motors 13. As a result, there is possible a higher accuracy of the rotary movement generated by the servo motors 13.

Control device 19 can be realized as a master/slave control, wherein control device 19 will detect an actual angular speed of the servo motor 13 of first drive unit 9 and preset said speed as a desired angular speed of the servo motor 13 of second unit 11. Of course, it is also possible to detect the actual angular speed of the servo motor 13 of second drive unit 11 and to preset said speed as a desired angular speed of the servo motor 13 of the first drive unit.

In the above regard, the CNC control can preset the rotational frequency for the first controller. The actual speed of the first controller will then be preset as a desired speed for the second controller. In this manner, synchronism of the rotational frequencies between the two servo motors, with respect to full revolutions, is rendered possible in an advantageous manner. In addition to the control signals of the master/slave control, also default values for acceleration and deceleration of the servo motors 13 during a revolution have been stored in the controllers.

The pushrods 17 of the first and second drive units 9,11 can have a length of e.g. 300 mm at maximum. It has become evident that, with such a length, the angular difference between the servo motors which is required when accelerating and decelerating the servo motors 13 during a revolution, can be kept low so that also the stress on the servo motors 13 will be low.

Thus, the cutting machine 1 of the invention is suited for carrying out the method of the invention for the cutting of block materials and particularly foamed materials. In the process, the knife element 5 with the first and second ends 5a,5b will be driven in a translatory manner for performing a reciprocating movement in the longitudinal direction. The driving force will be imparted on the first and second ends 5a,5b of knife element 5, wherein the driving of the first end 5a of knife element 5 is effected via the conversion of a first rotary movement into a first translatory movement, and the driving of the second end 5b of knife element 5 is effected via the conversion of a second rotary movement into a second translatory movement in the opposite sense of the first translatory movement.

The rotational frequency of the first rotary movement is, with respect to full revolutions, equal to the rotational frequency of the second rotary movement. In one revolution of the first and second rotary movements, the first rotary movement has a higher angular speed in a first and a second partial range of the revolution than the second rotary movement, and in a third and a fourth partial range of the revolution, the second rotary movement has a higher angular speed than the first rotary movement. At the start and respectively the end of a revolution and at the transition between the second and the third partial ranges of the revolution, the first and second rotary movements have an identical angular speed.

In the process, the first rotary movement will be accelerated in the first and the fourth partial range of the revolution and be decelerated in the second and the third partial range. The second rotary movement will be decelerated in the in the first and the fourth partial range of the revolution and be accelerated in the second and the third partial range.

For instance, the first rotary movement is generated by the first drive unit 9 and the second rotary movement is generated by the second drive unit 11.

In FIG. 2, the first and second rotary movements during a revolution are represented in diagrammatic form for clarification. In the Figure, the angle traversed by the respective rotary movement during revolution is shown per time unit. Plotted herein are two equivalent points of the first and second rotary movements. These points can be e.g. virtual points on the eccentric disks 15 of the first or second drive unit 9,11.

As evident from FIG. 2, two points do already have an angular offset at the start of the revolution. In the first partial range of the revolution, the rotary movement 1 has a higher speed than the rotary movement 2. Thereby, the angular offset between the two points will decrease in the course of the first partial range of the revolution. At the end of the first partial range, the two observed points are even. Due to the higher angular speed, rotary movement 1 will now proceed ahead of rotary movement 2 to a maximal angular difference which will be reached at the end of the second partial range. The rotational speed of the second rotary movement will now increase so that the angular difference between the two rotary movements will again be reduced until the end of the third partial range where the two observed points are even. In the fourth partial range, the angular difference will increase again until the end of the fourth partial range where the maximal angular difference will have been reached again. This maximal angular difference is the new starting point for the next revolution.

Corresponding thereto, FIG. 3 shows a schematic representation of the deviations of the observed points relative to an average value during one revolution.

At the start of the revolution, the observed points have the maximal angular difference. At the start of the revolution, the rotational speeds of the first and second rotary movements are identical. The second rotary movement is decelerated while the first rotary movement is accelerated. This is performed in the first partial range of the revolution until, at the end of the first partial range, the two observed points are even at an average angle of about 90°. At this time, the point of the first rotary movement has traversed an angle of more than 90°, and the point of the second rotary movement has traversed an angle of less than 90°.

The first to fourth partial ranges of the revolution can have different dimensions, i.e. the first partial range does not be necessarily have to end after 90°; instead, there may occur displacements within a revolution.

At the first end of the first partial range of the revolution, a relatively large difference exists between the angular speeds of the first and second rotary movements, resulting in a new angular difference between the two rotary movements. The first rotary movement will now be decelerated while the second rotary movement will be accelerated so that, at the end of the second partial range or at an average angle of 180°, both rotary movements have the same speed. In the third partial range, the first rotary movement will be further decelerated while the second rotary movement will be further accelerated so that both observed points will be even at an average traversed angle of 270°.

By the speed difference, an angular deviation will be caused again in the fourth partial range. Since, in the fourth partial range, the first rotary movement will again be accelerated and the second rotary movement will be decelerated, both rotary movements will again reach the same speed at the end of the fourth partial range and thus at the end of the revolution. The end of the revolution constitutes the starting point for a new revolution.

The invention claimed is:

1. A method for cutting block materials, wherein a knife element having a first and a second end is driven by a driving force in a translatory manner in a longitudinal direction for performing a reciprocating movement, the driving force being exerted on the first and second ends of the knife element, the driving of the first end of the knife element being performed by conversion of a first rotary movement into a first translatory movement, and the driving of the second end of the knife element being performed by conversion of a second rotary movement into a second translatory movement in a sense opposed to that of the first translatory movement, a first rotational frequency of the first rotary movement with respect to full revolutions being equal to a second rotational frequency of the second rotary movement, it being provided that, per revolution of the first and second rotary movements, the first rotary movement has a higher angular speed in a first and a second partial range of the revolution than the second rotary movement, and in a third and a fourth partial range of the revolution, the second rotary movement has a higher angular speed than the first rotary movement, and that, at the start and respectively the end of a revolution and at the transition between the second and the third partial ranges of the revolution, the first and second rotary movements have an identical angular speed.

2. The method according to claim 1, wherein the first rotary movement is accelerated in the first and fourth partial ranges of the revolution and is decelerated in the second and third partial ranges.

3. The method according to claim 1, wherein the second rotary movement is decelerated in the first and fourth partial ranges of the revolution and is accelerated in the second and third partial ranges.

4. The method according to claim 1, wherein the first and second rotary movements are generated by first and second servo motors.

5. The method according to claim 1, wherein the first and second rotary movements are each converted into the first and respectively the second translatory movement by means of an eccentric disk with a pushrod.

6. The method according to claim 1, wherein a controlling of the first and second rotary movements is performed via a master/slave control unit, an actual angular speed of the first rotary movement being preset as a desired angular speed of the second rotary movement, or an actual angular speed of the second rotary movement being preset as a desired angular speed of the first rotary movement.

7. The method according to claim 1, wherein the angular speeds of the first and the second rotary movement periodically vary during a revolution.

8. The method according to claim 1, wherein the knife element is rotatable about an axis extending in the longitudinal direction of the knife element.

9. The method according to claim 1, wherein differences in an angle of rotation between the first and second rotary movements as occurring during a revolution are 10° at maximum.

10. A cutting machine for the cutting of block materials, said cutting machine comprising a machine frame, a knife element having a first and a second end, a guide means for guiding the knife element in a longitudinal direction of the knife element, and first and second drive units, the first drive unit being coupled to the first end of the knife element, and the second drive unit being coupled to the second end of the knife element, the first or the second drive unit being arranged on a tensioning means provided for setting the tension of the knife element, wherein the first and second drive unit each comprise a servo motor and an eccentric disk with a pushrod, said disk being coupled to the respective servo motor, and the first and second ends of the knife element having a respective one of said pushrods connected to it, and a common control unit is operative to control the servo motors of the first and second drive units, said control unit being operative to control a rotational frequency of the servo motors synchronously with respect to full revolutions, and, during a revolution of the servo motors, to decelerate and again accelerate at least one of the servo motors in such a manner that, in a first and a second partial range of the revolution, the servo motor of the first drive unit has a larger angular speed than the servo motor of the second drive unit and, in a third and a fourth partial range of the revolution, the servo motor of the second drive unit has a larger angular speed than the servo motor of the first drive unit.

11. The cutting machine according to claim 10, wherein the control unit is a master/slave control, said control unit detecting an actual angular speed of the servo motor of the first drive unit and presetting it as a desired angular speed of the servo motor of the second drive unit, or detecting an actual angular speed of the servo motor of the second drive unit and presetting said actual angular speed as a desired angular speed of the servo motor of the first drive unit.

12. The cutting machine according to claim 10, wherein the tensioning means comprises a plate which is displaceable in the longitudinal direction of the knife element, said plate having the first or the second drive means arranged on it.

13. The cutting machine according to claim 10, wherein with the aid of the guide means, the knife element is rotatable about an axis extending in the longitudinal direction of the knife element.

14. The cutting machine according to claim 10, wherein the servo motors are arranged vertically and the eccentric disks are arranged in a horizontal plane.

15. The cutting machine according to claim 10, wherein the pushrods have a length between 150 mm and 300 mm.

16. A method of operating the cutting machine of claim 10, wherein the servo motors of the first and second drive units are driven with the same rotational frequency with respect to full revolutions, at the start and respectively at the end of a revolution of the servo motors of the first and second drive units, the servo motors have the same rotational speed, in the first and the fourth partial range of the revolution, the servo motor of the first drive unit is accelerated and the servo motor of the second drive unit is decelerated, in the second and the third partial range of the revolution, the servo motor of the first drive unit is decelerated and the servo motor of the second drive unit is accelerated, and at the transition between the second and the third partial range of the revolution, the servo motors have the same speed again.

* * * * *